United States Patent [19]

Timm

[11] Patent Number: 4,484,239

[45] Date of Patent: Nov. 20, 1984

[54] MINIATURE CASETTE TAPE RECORDER-PLAYER

[75] Inventor: Horst Timm, Hildesheim, Fed. Rep. of Germany

[73] Assignee: Blaupunkt-Werke GmbH, Hildesheim, Fed. Rep. of Germany

[21] Appl. No.: 354,728

[22] Filed: Mar. 4, 1982

[30] Foreign Application Priority Data

Mar. 18, 1981 [DE] Fed. Rep. of Germany ....... 3110480

[51] Int. Cl.³ ............................................. G11B 15/68
[52] U.S. Cl. ...................................................... 360/92
[58] Field of Search ................... 360/92, 69, 85, 93, 360/137, 96.5; 242/197, 198, 199, 200

[56] References Cited

U.S. PATENT DOCUMENTS

| | | | |
|---|---|---|---|
| 3,127,178 | 3/1964 | Osborne | 360/92 |
| 3,693,981 | 9/1972 | Ban | 360/92 |
| 3,697,083 | 10/1972 | Ban | 360/92 |
| 3,898,692 | 8/1975 | Teruuchi | 360/92 |
| 4,308,562 | 12/1981 | Negishi | 360/96.5 |
| 4,319,290 | 3/1982 | Bolick | 360/137 |
| 4,384,310 | 5/1983 | Schatteman | 360/92 |
| 4,415,301 | 11/1983 | Zielke | 360/92 |

FOREIGN PATENT DOCUMENTS 0013806 8/1980 European Pat. Off. .
53-132313 11/1978 Japan .

Primary Examiner—Robert M. Kilgore
Attorney, Agent, or Firm—Frishauf, Holtz, Goodman & Woodward

[57] ABSTRACT

A mini cassette apparatus operates with an interchangeable cassette magazine on which a number of interchangeable minicassettes or microcassettes can be installed, similarly arranged on the intermittently rotatable plate with respect to the center of rotation. As the disk plate is intermittently rotated from the exterior from one position to another, the successive cassettes are moved into operating position with respect to the tape drive of the apparatus.

19 Claims, 7 Drawing Figures

MINIATURE CASETTE TAPE RECORDER-PLAYER

This invention concerns a tape recorder-player for minature cassettes, sometimes referred to as minicassettes, or microcassettes, and in particular a tape recorder-player capable of playing several cassettes in succession.

Miniature cassettes have become widely used, mainly for dictating machines, but in the meanwhile they have also come into use to some extent in high fidelity audio equipment and systems, even stereo music systems, because of the handiness of microcassette equipment.

Since the minicassettes have the same playing time as the previously conventional CC cassettes (so-called compact cassettes), minicassette players and recorders are of particular interest because of their small space requirements, which applies both to the tape drives and to the cassettes themselves, for use in motor vehicles, particularly when integrated with an automobile radio set.

THE INVENTION

It is an object of the present invention to provide a minicassette tape recorder-player suitable for a vehicular installation in which several minicassettes can be played in a selectable sequence without requiring manual change of cassettes or turning over individual cassettes for reversal (playing the other side).

Briefly, the reversal problem is solved by providing forward and reverse spindles and pressure rollers for driving the tape in opposite directions without turning over the cassette. The sequential playing of cassettes without manually changing cassettes is accomplished by providing a rim-driven turntable on which a number of cassettes can be placed replaceably or removably, the several cassettes being arranged in the same relation to a central axis about which the disk plate is rotatable. The rim drive is organized so that the disk plate can be rotated so as to bring each cassette sequentially into an operating position in which it is moved into engagement with the tape drive. The turntable is preferably fitted into a magazine within which it is rotatable.

The extension of the duration of cassette playing without manual change of cassettes is a great advantage, and in particular it is preferred to provide four minicassettes on the disk plate in a rectangular windmill arm array. This arrangement in a magazine particularly simplifies use of a tape recorder-player in a motor vehicle, because the handling of individual cassettes of such small size is more difficult than has been the case with the larger cassettes previously used. The handling of a magazine of cassettes is easier and involves less possible damage to the cassettes than the handling of individual minicassettes in an automobile environment.

The magazine is itself insertable and releasable in the apparatus, and its construction shape favors a desirably flat construction configuration. Furthermore, the invention provides an advantageous simple arrangement for locking the spools against rotation when the cassettes are seated in idle condition in the magazine.

THE DRAWINGS

The invention is further described by way of illustrative example with reference to the annexed drawings, in which.

Figure 2:
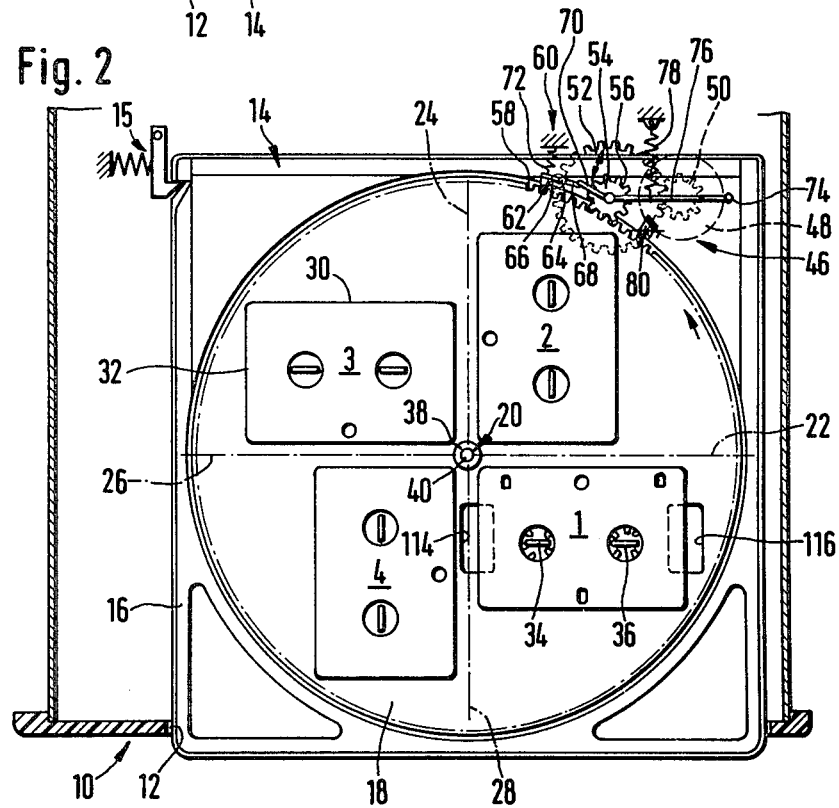
FIG. 2 is a top view of a magazine for the tape part of the combined apparatus, utilizing an array of minicassettes on a rotary plate, located in operating position.
Figure 3:
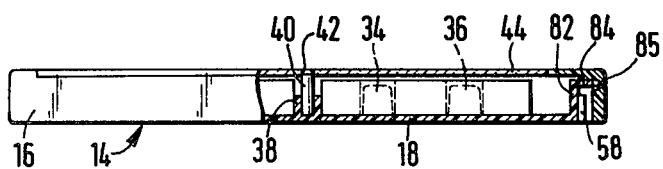
FIG. 3 is a front view, partly in section, of the magazine portion of FIG. 2.
Figure 4:
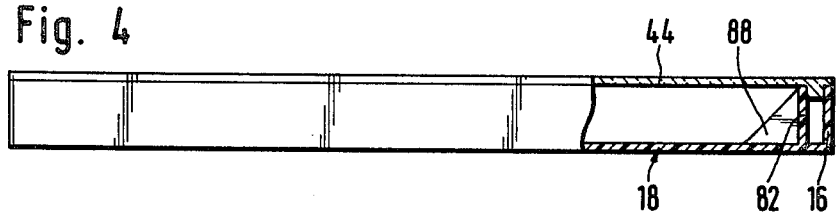
Figure 5:
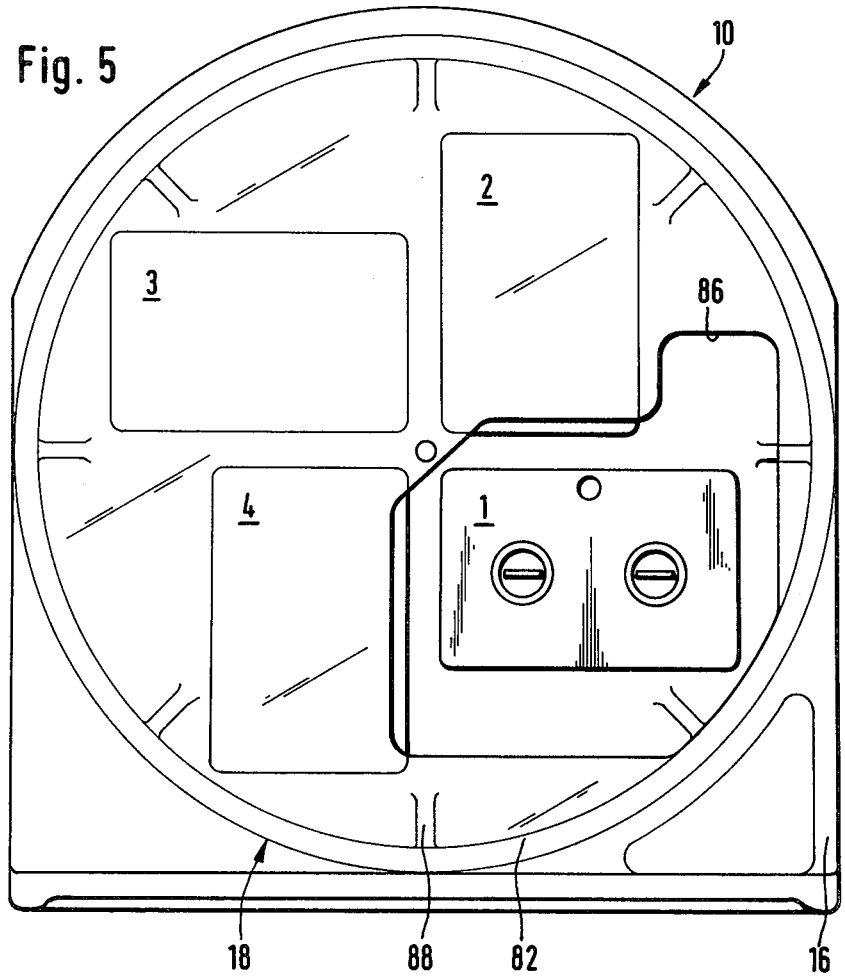
Figure 6:
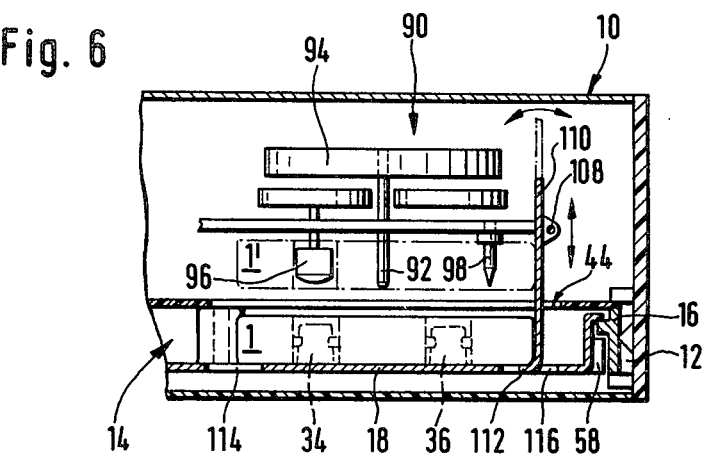
Figure 7:
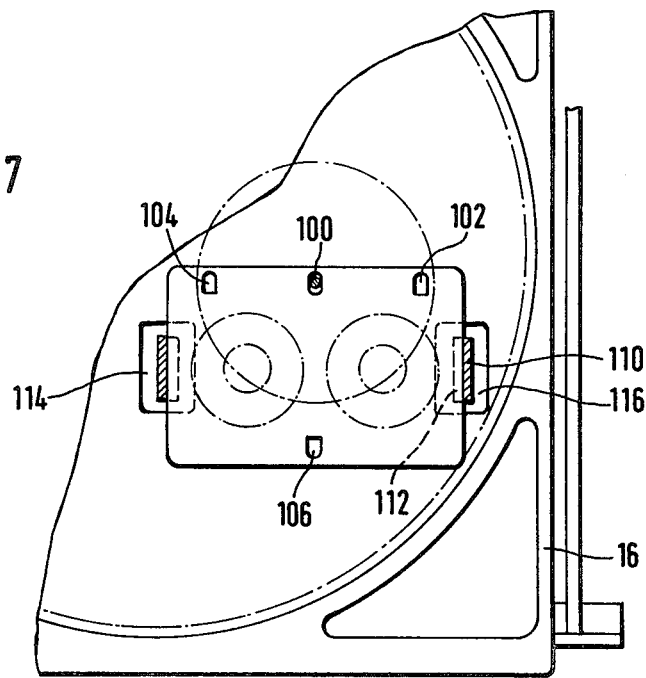

FIGS. 4 and 5 are further simplified views corresponding to FIGS. 2 and 3 and relating to a modified embodiment of a magazine according to the invention, and FIGS. 6 and 7 are broken out and sectioned views of an equipment with an interchangeable magazine and the association of the magazine with a cassette drive.

DESCRIPTION OF THE ILLUSTRATED EMBODIMENTS

Figure 1:
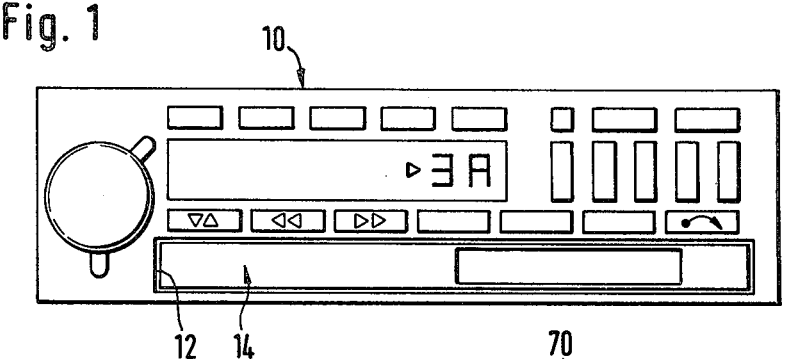
FIG. 1 is a front panel view of a combined radio and cassette apparatus for a vehicle.

A combined vehicle radio and minicassette tape player 10 illustrated in FIG. 1 has a magazine sheath 12 that opens up in the front panel of the equipment for accessability. An interchangeable magazine 14 carrying preferably four minicassettes fits into the sheath, as shown in FIGS. 2 and 3. The magazine is arranged to be locked in place by a catch mechanism of known construction shown at 15, which is releasable for a rotary plate 18 mounted, as shown in FIG. 2, after the fashion of windmill arms in a perpendicularly crossing arrangement with uniform spacing from one to the next.

The disk 18 is divided into four equal sectors by four radii shown by the auxiliary lines 22 to 28 forming parts of diameters that cross at right angles. In each sector, one cassette is located having longer and shorter sides, as indicated at 30 and 32, being closely spaced and parallel to successive auxiliary radial lines already mentioned and relating to the sector in question. Each cassette in its sector thus lies with a longer edge surface and a shorter edge surface adjacent to a cassette in the neighboring sector, at the same spacing of parallel sides, the significance of which similarity in spacing will be explained further below.

In the illustrated example, the longer edge surface of one cassette lies against the shorter edge surface of the adjacent one, the longer edge surface being the front edge surface. The arrangement could of course, according to the disposition of the drive, also be so chosen that in neighboring sectors the back longer edge surface is adjacent to the shorter or end edge surface of the neighboring cassette.

Tongues 34 and 36 extend up from the turntable 18 in the appropriate places of each sector, fitting into the internal grooves of the tape spools of each cassette put in place in the magazine. As spool winding safety provisions, they prevent the formation of tape loops in the cassettes and serve at the same time for defining and fixing the assigned position of the cassettes set into the magazine. If desired, the turntable 18 can also have depressions for the cassettes or ribs around them up to about half the cassette height to facilitate insertion of the cassettes into the magazine.

The turntable 18 has at its hub 20 a bearing, provided for example by a bearing pin 40, set into an upwardly extending bushing 48 formed in the turntable 18 at its center. As shown in FIG. 3, its upwardly projecting end extends into a bearing hole 42 in an upper cover 44 of the magazine casing and terminates flush with the surface of the cover 44. Drive means 46 at the side of the apparatus symbolically indicated in FIG. 2 serve to drive the magazine plate 18 for the changeover movement of the cassettes 1 to 4 of the magazine 14 inserted and locked in the magazine sheath 12.

The drive means 46 consist essentially of a motor 48 and gearing constituted for example of the gears 50 and 52 for cooperation with a drive roller 54 engaging the edge of the turntable 18. The drive roller 54 comes into driving contact with the edge of the turntable 18 through an entrance opening provided in the casing 16, automatically upon insertion of the cassette.

The drive can, as desired, be a friction drive or, as indicated in the drawings, the positive drive through teeth 56 and 58 of the drive roller 54 and of the edge of the turntable 18. The turntable lock 60 operating after the fashion of a catch pawl is of advantage in the magazine 14 because by this the turntable 18 in being removed from the magazine is automatically secured against unintended rotation. The turntable lock 60 consists, for example, of a catch projection 62 cooperating with the teeth 58 of the edge of the plate. The catch 62 is pivoted at 64 in the magazine sheath. The arm 68 of the lever carrying the catch 62 meets a stop 70 fixed in the equipment so that the arresting mechanism of the plate disk is released against the tension of the spring 72 operating on the catch 62 when the magazine is in its sheath.

In the illustrated embodiment, the fixed stop 70 is seated at 74 on an arm 76 pivoted at 74 in the apparatus 10 and containing at its free end the rotatably mounted drive roller or pinion 54. When the magazine is empty, the lever 76 lies against a stop 80 fixed in the casing by virtue of the mechanical bias provided by the spring 78 supported on the casing. It is freed therefrom by abutment against the disk 18 of a magazine inserted into place. This arrangement is particularly advantageous when the motor 48 serves both for the disk plate drive and for the cassette and tape drive. The drive pinion 54 lying against the edge of the turntable 18 for rotating the same when necessary, is then disconnected, for example by an electromagnetic control, from the disk edge for the beginning of a cassette driving operation, so that the catch device 60 falls into place and the disk plate 18 stops in locked position during the driving of the cassette for a playback operation.

As shown in FIG. 3, the turntable 18, as a further development of the invention, can be constituted with a deep drawn rim 82 and thereby have the shape of a flat pot. The peripheral wall of the deep drawn disk rim then has a scored surface or a friction coating, or else the teeth 58, for the disk drive 46 which projects through an opening of the magazine frame into the magazine 14 when the latter is inserted into the sheath 12 provided in the apparatus.

A radially projecting outer ring flange 84 at the upper edge of the deep drawn disk rim 82 is guided in a ring groove 85 interrupted at least at the entry opening for the drive 46 on the interior wall surface of the casing frame 16 surrounding the turntable 18.

This guiding provides, in connection with the central bearing location 12, for a troublefree rotation of the turntable 18 during cassette transport.

FIGS. 4 and 5 show in more simplified form another magazine embodiment.

In spite of this slight modification, the same reference numerals are used in FIGS. 4 and 5 for the same or corresponding parts in FIGS. 2 and 3.

FIG. 5 shows another opening 86 which was omitted for reasons of simplicity in FIG. 1. This opening is in the upper magazine cover 44 connected with the frame 16 of the magazine casing. This opening, which lies opposite to the drive platen of the tape transport in the magazine sheath, serves also for removing and inserting of the cassettes in filling the magazine. If desired, this opening can be closed by a slide cover or jalousie for the protection of the magazine. FIG. 5 also shows a few web-shaped reinforcement ribs directed radially inwards on the turntable 18. These are preferably distributed at equal spacing around the disk and stabilize the deep drawn turntable rim 18.

FIGS. 6 and 7 show, still schematically simplified, the configuration of a cassette tape transport drive 90, which, in the illustrated embodiments, are arranged above the magazine sheath 12 and the opening 86 in the upper cover 44 of a magazine 14 inserted in the magazine shaft. Of the tape drive equipment there are shown only the spindle 92 with its flywheel 94 of the drive, arranged centrally for minicassettes, only one of the drive studs 96 for fast forward or reverse and only one of the reference pins 98 inserted into a reference in the mounted cassette.

The holes 100 for passage of the spindle and the reference holes 102 to 106 are shown for the microcassette 1 in FIG. 7, for an example.

FIGS. 6 and 7 also show one of two arms 110 movable together in height arranged on opposite sides of a cassette and pivotally mounted at 108. These have bent-over grasping members at their lower ends bent over at right angles to the cassette for lifting it.

These grasping arms 110 and 112, downwardly moved in a swung-out position, dip through floor openings 114 and 116 of the disk 18, grasp the cassette and lift it from the anti-turning locks 34 and 36 into the operating position designated 1' of the cassette on the drive mechanism 90. Then for beginning of operation, the drive spindle chosen for the direction of tape movement and its pressure roller are moved against the tape of the cassette. The regular spacing between neighboring cassettes on the disk plate 18 of the magazine 14, explained with reference to FIG. 2, comes into play and it also provides sufficient room for the central bearing 20 of the turntable 18. The control of the cassette lifting just explained can be taken over, for example, by the motor 48 serving for the drive of the turntable 18, since the turntable is in any event arrested during the playing of a cassette.

The stepwise rotation of the turntable 18 between the different playing positions can be controlled electromechanically, electromagnetically or optoelectrically. Such controls are well-known and need not be further described here.

Furthermore, an apparatus according to the invention can be equipped to search for a cassette ready for recording or for playback. If desired, during playback, the number, page and other such data can be displayed on a visible digital display if the combined vehicle radio and tape recorder-player is equipped with such a display.

The invention explained with reference to an illustrative example constituted as a combined vehicle radio and cassette equipment can also be used with advantage in other types of equipment, for example, also in so-called tape decks for use in a home.

In a particularly economical embodiment of the magazine 14 according to the invention, the turntable 18 with the integrally formed protection projections 34 and 36 regarding rotation of spools not in use, and also the magazine frame 16 can be made of plastic, with the magazine cover 44 preferably made of a transparent material, for example acrylate.

I claim:

1. A small-cassette magnetic tape recorder-player having a cassette tape drive capable of operating with tape transport in either direction for cassettes of substantially oblong rectangular contour, comprising:

a cassette magazine insertable in and removable from a sheath therefor in the structure of said recorder-player, said magazine having a turntable which is rotatable about a pivot engageable at its center and means for carrying four cassettes on said turntable while maintaining them in rectangular windmill arm array at small spacing from each other about said center (20), so that diameters of said turntable which are perpendicular to each other pass between adjacent cassettes and substantially bisect said gaps, each of said gaps being bounded by a long contour side of one cassette and a short contour side of another cassette;

means for locking said magazine in said sheath in response to full insertion of the magazine;

means for releasing said magazine from said sheath, and means for rotating said turntable of said magazine, when the latter is locked in said sheath, for a part of a revolution at a time for successively placing the several cassettes on said turntable in operative relation with said tape drive, while said cassettes remain in said windmill configuration as viewed parallel to an axis through said center (20) perpendicular to said turntable.

2. A tape recorder-player as defined in claim 1, in which said turntable (18) is provided with depressions in its surface for positioning said cassettes thereon.

3. A tape recorder-player as defined in claim 1, in which said turntable is enclosed in a surrounding casing frame (16) with respect to which it is capable of revolving.

4. A tape recorder-player as defined in claim 1, in which said turntable has an upturned cylindrical rim (32).

5. A tape recorder-player as defined in claim 4, in which said upturned rim is provided with stabilizing ribs on its interior wall.

6. A tape recorder-player as defined in claim 4, in which said upturned rim (82) at its free top edge has an outwardly extending ring flange (84).

7. A tape recorder-player as defined in claim 3, in which said turntable is provided with a rotary bearing in said casing frame (16) of said magazine.

8. A tape recorder-player as defined in claim 3, in which said surrounding casing frame (16) of said magazine has a top cover (44) connected to its upper edge provided with an access opening (86) with respect to the location for cassette operation for access of said tape drive to a cassette and for removal of individual cassettes.

9. A tape recorder-player as defined in claim 8, in which a central bearing stud connected to said turntable (18) is provided for centering said turntable in a central bearing bore (42) of said cover (44) of said magazine casing frame (16).

10. A tape recorder-player as defined in claim 6, in which a substantially ring-shaped guide cavity (85) is provided in said casing frame (16) which is interrupted at least by an entry opening for a rim drive (46) for the magazine.

11. A tape recorder-player as defined in claim 1, having rim drive means (46) and a brake for said turntable and in which means are provided whereby upon insertion of said magazine in said sheath, said brake for said turntable is released and said rim drive means (46) are brought into operative relation with the periphery (58,82) of said turntable (18).

12. A tape recorder-player as defined in claim 11, in which said rim drive means (46) are incorporated in said tape recorder-player which is constituted as a geared drive.

13. A tape recorder-player as defined in claim 11, in which said rim drive means (46) are incorporated in said tape recorder-player which is constituted as a friction drive.

14. A tape recorder-player as defined in claim 1, in which vertical shift transport means are provided having swinging arms (110) provided with cassette grips (112), and cavities or openings in said turntable (18) are provided that are so located as to enable said arms and cassette grips to lift the individual cassette brought into operating condition on said turntable into operative connection with said tape drive.

15. A tape recorder-player as defined in claim 1, in which projections for locking cassette spools against rotation are provided on the surface of said turntable (18) for engagement with the axial internal slots of the tape spools for locking said spools against rotation while said cassettes are set in said magazine (14) and not lifted out of position for engagement with said tape drive.

16. A tape recorder-player as defined in claim 11 in which said brake (60) for said turntable (18) is provided in the form of a catch pawl in said magazine casing frame (16) adjacent to the rim (58) of said turntable and a lever arm (68) is provided on said catch pawl (62), while a stop (70) is likewise provided, so that said catch pawl may be released by said lever coming against said stop when said magazine (14) is fully inserted in said sheath (12).

17. A magnetic tape recorder-player for use with tape cassettes of oblong rectangular contour and having a cassette tape drive capable of operating with tape transport in either direction and recording and playback means for operation with tape of a cassette engaged in said cassette tape drive, said recorder-player further comprising:

means for holding four cassettes, seated on a common plane, each with a short side facing a long side of another of said cassettes across a substantially uniform gap in an array, leaving space occupied in part by rotary bearing means in the center of the array, and for rotating the thus held cassettes about an axis fixed with respect to said tape drive and passing centrally through said rotary bearing while maintaining their relative positions;

a casing for said recorder-player having a surface thereof provided with a means for location of said cassette holding and rotating means on said surface;

rim drive mounted on said casing means for controllably imparting rotary motion to said cassette holding and rotating means and for advancing the cassettes from one to the next of four positions relative to said casing, one of which is a ready-position for a cassette;

indexing means for fixing said holding and rotating means in position when said rim drive means is inactive, and means for providing vertical movement of a cassette from its place in said holding and rotating means, when said cassette is in said ready position, into an operating position, into an operating position in engagement with said tape drive, and for providing vertical movement of a cassette from said operating position back into place in said holding and rotating means.

18. A tape recorder-player as defined in claim 1 in which said holding and rotating means is provided with a vertically extending rim portion disposed for engagement by said rim drive means.

19. A tape recorder-player as defined in claim 1, in which at least one aperture is provided in said rim portion or in an extension thereof for engagement with said indexing means.

* * * * *